(12) United States Patent
Rickman et al.

(10) Patent No.: US 7,407,010 B2
(45) Date of Patent: Aug. 5, 2008

(54) METHODS OF COATING PARTICULATES

(75) Inventors: Richard D. Rickman, Duncan, OK (US); Philip D. Nguyen, Duncan, OK (US); Jimmie D. Weaver, Duncan, OK (US); Johnny A. Barton, Marlow, OK (US); Bhadra D. Desai, Duncan, OK (US); Max L. Phillippi, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 124 days.

(21) Appl. No.: 11/378,659

(22) Filed: Mar. 16, 2006

(65) Prior Publication Data

US 2007/0215354 A1  Sep. 20, 2007

(51) Int. Cl.
*E21B 33/13* (2006.01)
*E21B 43/27* (2006.01)

(52) U.S. Cl. .......................... 166/295; 166/300
(58) Field of Classification Search .............. None
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |

(Continued)

FOREIGN PATENT DOCUMENTS

CA  2063877  5/2003

(Continued)

OTHER PUBLICATIONS

Halliburton, *CoalStim*[SM] *Service*, Helps Boost Cash Flow From CBM Assets, Stimulation, HO3679 Oct. 2003, 2003, Halliburton Communications.

(Continued)

*Primary Examiner*—Zakiya W. Bates
*Assistant Examiner*—Angela M DiTrani
(74) *Attorney, Agent, or Firm*—Robert A. Kent; Baker Botts LLC

(57) ABSTRACT

Methods comprising: providing at least a plurality of liquid hardenable resin coated particulates that have been at least partially coated with a liquid hardenable resin component; providing at least a plurality of liquid hardening agent coated particulates that have been at least partially coated with a liquid hardening agent component; suspending the liquid hardenable resin coated particulates and the liquid hardening agent coated particulates in a treatment fluid; and placing the treatment fluid into a subterranean formation. Methods comprising: providing at least a plurality of coated particulates that have been at least partially coated with one component of a two component resin system; coating at least a plurality of the coated particulates on a job site with a second component of a two component resin system; suspending the coated particulates in a treatment fluid; and placing the treatment fluid into a subterranean formation.

17 Claims, No Drawings

U.S. PATENT DOCUMENTS

| | | | | |
|---|---|---|---|---|
| 4,352,674 A | 10/1982 | Fery ............................ 23/230 |
| 4,353,806 A | 10/1982 | Canter et al. ................ 507/229 |
| 4,387,769 A | 6/1983 | Erbstoesser et al. ......... 166/295 |
| 4,415,805 A | 11/1983 | Fertl et al. ................... 250/260 |
| 4,439,489 A | 3/1984 | Johnson et al. ............. 428/404 |
| 4,443,347 A | 4/1984 | Underdown et al. .... 252/8.55 R |
| 4,460,052 A | 7/1984 | Gockel ........................ 175/72 |
| 4,470,915 A | 9/1984 | Conway ................. 252/8.55 R |
| 4,493,875 A | 1/1985 | Beck et al. .................. 428/403 |
| 4,494,605 A | 1/1985 | Wiechel et al. ............. 166/288 |
| 4,498,995 A | 2/1985 | Gockel .................. 252/8.5 LC |
| 4,501,328 A | 2/1985 | Nichols ....................... 166/288 |
| 4,526,695 A | 7/1985 | Erbstosser et al. ....... 252/8.55 R |
| 4,527,627 A | 7/1985 | Graham et al. ............. 166/280 |
| 4,541,489 A | 9/1985 | Wu ............................ 166/312 |
| 4,546,012 A | 10/1985 | Brooks ....................... 427/213 |
| 4,553,596 A | 11/1985 | Graham et al. ............. 166/295 |
| 4,564,459 A | 1/1986 | Underdown et al. .... 252/8.55 R |
| 4,572,803 A | 2/1986 | Yamazoe et al. ............. 534/16 |
| 4,585,064 A | 4/1986 | Graham et al. ............. 166/280 |
| 4,649,998 A | 3/1987 | Friedman .................... 166/294 |
| 4,664,819 A | 5/1987 | Glaze et al. ............. 252/8.551 |
| 4,665,988 A | 5/1987 | Murphey et al. ............ 166/295 |
| 4,669,543 A | 6/1987 | Young ........................ 166/276 |
| 4,675,140 A | 6/1987 | Sparks et al. ................ 264/4.3 |
| 4,683,954 A | 8/1987 | Walker et al. ............... 166/307 |
| 4,694,905 A | 9/1987 | Armbruster ................. 166/280 |
| 4,715,967 A | 12/1987 | Bellis ..................... 252/8.551 |
| 4,716,964 A | 1/1988 | Erbstoesser et al. ......... 166/284 |
| 4,733,729 A | 3/1988 | Copeland .................... 166/276 |
| 4,739,832 A | 4/1988 | Jennings, Jr. et al. ........ 166/299 |
| 4,785,884 A | 11/1988 | Armbruster ................. 166/280 |
| 4,787,453 A | 11/1988 | Hewgill et al. ........... 166/272.3 |
| 4,789,105 A | 12/1988 | Hosokawa et al. ............. 241/67 |
| 4,796,701 A | 1/1989 | Hudson et al. .............. 166/278 |
| 4,797,262 A | 1/1989 | Dewitz ....................... 422/142 |
| 4,800,960 A | 1/1989 | Friedman et al. ............ 166/276 |
| 4,809,783 A | 3/1989 | Hollenbeck et al. ......... 166/307 |
| 4,817,721 A | 4/1989 | Pober ......................... 166/295 |
| 4,829,100 A | 5/1989 | Murphey et al. ............ 523/131 |
| 4,838,352 A | 6/1989 | Oberste-Padtberg et al. 166/291 |
| 4,842,072 A | 6/1989 | Friedman et al. ............ 166/295 |
| 4,843,118 A | 6/1989 | Lai et al. .................... 524/555 |
| 4,848,467 A | 7/1989 | Cantu et al. ................. 166/281 |
| 4,848,470 A | 7/1989 | Korpics ....................... 166/312 |
| 4,850,430 A | 7/1989 | Copeland et al. ............ 166/276 |
| 4,886,354 A | 12/1989 | Welch et al. .................. 356/70 |
| 4,888,240 A | 12/1989 | Graham et al. ............. 428/403 |
| 4,895,207 A | 1/1990 | Friedman et al. ............ 166/276 |
| 4,903,770 A | 2/1990 | Friedman et al. ............ 166/288 |
| 4,934,456 A | 6/1990 | Moradi-Araghi ............ 166/270 |
| 4,936,385 A | 6/1990 | Weaver et al. .............. 166/288 |
| 4,942,186 A | 7/1990 | Murphey et al. ............ 523/131 |
| 4,957,165 A | 9/1990 | Cantu et al. ................. 166/295 |
| 4,959,432 A | 9/1990 | Fan et al. .................... 526/287 |
| 4,961,466 A | 10/1990 | Himes et al. ................ 166/250 |
| 4,969,522 A | 11/1990 | Whitehurst et al. ......... 166/278 |
| 4,969,523 A | 11/1990 | Martin et al. ................ 166/278 |
| 4,986,353 A | 1/1991 | Clark et al. .................. 166/279 |
| 4,986,354 A | 1/1991 | Cantu et al. ................. 166/279 |
| 4,986,355 A | 1/1991 | Casad et al. ................. 166/295 |
| 5,030,603 A | 7/1991 | Rumpf et al. ............... 501/127 |
| 5,049,743 A | 9/1991 | Taylor, III et al. ........... 250/303 |
| 5,082,056 A | 1/1992 | Tackett, Jr. ................. 166/295 |
| 5,107,928 A | 4/1992 | Hilterhaus .................. 166/293 |
| 5,128,390 A | 7/1992 | Murphey et al. ............ 523/130 |
| 5,135,051 A | 8/1992 | Facteau et al. .............. 166/104 |
| 5,142,023 A | 8/1992 | Gruber et al. ............... 528/354 |
| 5,165,438 A | 11/1992 | Facteau et al. .................. 137/1 |
| 5,173,527 A | 12/1992 | Calve .......................... 524/74 |
| 5,178,218 A | 1/1993 | Dees ........................... 166/281 |
| 5,182,051 A | 1/1993 | Bandy et al. ................. 252/645 |
| 5,199,491 A | 4/1993 | Kutts et al. .................. 166/276 |
| 5,199,492 A | 4/1993 | Surles et al. ................. 166/295 |
| 5,211,234 A | 5/1993 | Floyd .......................... 166/276 |
| 5,216,050 A | 6/1993 | Sinclair ....................... 524/108 |
| 5,218,038 A | 6/1993 | Johnson et al. .............. 524/541 |
| 5,232,955 A | 8/1993 | Caabai et al. .................. 521/63 |
| 5,232,961 A | 8/1993 | Murphey et al. ............ 523/414 |
| 5,238,068 A | 8/1993 | Fredickson ................. 166/307 |
| 5,247,059 A | 9/1993 | Gruber et al. ............... 528/354 |
| 5,249,628 A | 10/1993 | Surjaatmadja .............. 166/305 |
| 5,256,729 A | 10/1993 | Kutts et al. .................. 524/700 |
| 5,273,115 A | 12/1993 | Spafford ..................... 166/281 |
| 5,285,849 A | 2/1994 | Surles et al. ................. 166/295 |
| 5,293,939 A | 3/1994 | Surles et al. ................. 166/295 |
| 5,295,542 A | 3/1994 | Cole et al. ................... 166/278 |
| 5,320,171 A | 6/1994 | Laramay .................... 166/285 |
| 5,321,062 A | 6/1994 | Landrum et al. ............ 523/141 |
| 5,325,923 A | 7/1994 | Surjaatmadja et al. ...... 166/308 |
| 5,330,005 A | 7/1994 | Card et al. ................... 166/280 |
| 5,332,037 A | 7/1994 | Schmidt et al. ............. 166/276 |
| 5,335,726 A | 8/1994 | Rodrigues ................... 166/295 |
| 5,351,754 A | 10/1994 | Hardin et al. ............... 166/249 |
| 5,358,051 A | 10/1994 | Rodrigues ................... 166/295 |
| 5,359,026 A | 10/1994 | Gruber ....................... 528/354 |
| 5,360,068 A | 11/1994 | Sprunt et al. ................ 166/259 |
| 5,361,856 A | 11/1994 | Surjaatmajda ................ 175/67 |
| 5,363,916 A | 11/1994 | Himes et al. ................ 166/276 |
| 5,373,901 A | 12/1994 | Norman et al. ............. 166/300 |
| 5,381,864 A | 1/1995 | Nguyen et al. .............. 166/280 |
| 5,386,874 A | 2/1995 | Laramay et al. ............. 166/300 |
| 5,388,648 A | 2/1995 | Jordan, Jr. .................. 166/380 |
| 5,393,810 A | 2/1995 | Harris et al. ................... 524/56 |
| 5,396,957 A | 3/1995 | Surjaatmadja et al. ...... 166/308 |
| 5,402,846 A | 4/1995 | Jennings, Jr. et al. ........ 166/259 |
| 5,422,183 A | 6/1995 | Sinclair et al. .............. 428/403 |
| 5,423,381 A | 6/1995 | Surles et al. ................. 166/295 |
| 5,439,055 A | 8/1995 | Card et al. ................... 166/280 |
| 5,460,226 A | 10/1995 | Lawton et al. .............. 166/300 |
| 5,464,060 A | 11/1995 | Hale et al. ................... 166/293 |
| 5,475,080 A | 12/1995 | Gruber et al. ............... 528/354 |
| 5,484,881 A | 1/1996 | Gruber et al. ................. 528/54 |
| 5,492,178 A | 2/1996 | Nguyen et al. .............. 166/276 |
| 5,494,103 A | 2/1996 | Surjaatmadja et al. ...... 166/222 |
| 5,497,830 A | 3/1996 | Boles et al. ................. 166/300 |
| 5,498,280 A | 3/1996 | Fistner et al. ................. 106/19 |
| 5,499,678 A | 3/1996 | Surjaatmadja et al. ...... 166/298 |
| 5,501,275 A | 3/1996 | Card et al. ................... 166/280 |
| 5,505,787 A | 4/1996 | Yamaguchi .................... 134/4 |
| 5,512,071 A | 4/1996 | Yam et al. ..................... 51/307 |
| 5,520,250 A | 5/1996 | Harry et al. ................. 166/276 |
| 5,522,460 A | 6/1996 | Shu ............................ 166/295 |
| 5,529,123 A | 6/1996 | Carpenter et al. ........... 166/293 |
| 5,531,274 A | 7/1996 | Bienvenu, Jr. .............. 166/280 |
| 5,536,807 A | 7/1996 | Gruber et al. ............... 528/354 |
| 5,545,824 A | 8/1996 | Stengel et al. ............... 524/590 |
| 5,547,023 A | 8/1996 | McDaniel et al. ........... 166/280 |
| 5,551,513 A | 9/1996 | Surles et al. ................. 166/278 |
| 5,551,514 A | 9/1996 | Nelson et al. ............... 166/280 |
| 5,582,249 A | 12/1996 | Caveny et al. .............. 166/276 |
| 5,582,250 A | 12/1996 | Constein .................... 166/280 |
| 5,588,488 A | 12/1996 | Vijn et al. ................... 166/293 |
| 5,591,700 A | 1/1997 | Harris et al. ................. 507/204 |
| 5,594,095 A | 1/1997 | Gruber et al. ............... 528/354 |
| 5,595,245 A | 1/1997 | Scott, III .................. 166/250.1 |
| 5,597,784 A | 1/1997 | Sinclair et al. .............. 507/219 |
| 5,604,184 A | 2/1997 | Ellis et al. ................... 507/117 |
| 5,604,186 A | 2/1997 | Hunt et al. .................. 507/204 |
| 5,609,207 A | 3/1997 | Dewprashad et al. ....... 166/276 |
| 5,620,049 A | 4/1997 | Gipson et al. ............... 166/248 |
| 5,639,806 A | 6/1997 | Johnson et al. ............. 523/208 |
| 5,670,473 A | 9/1997 | Scepanski ................... 510/445 |
| 5,697,440 A | 12/1997 | Weaver et al. .............. 166/281 |

| Patent | Date | Inventor | Class |
|---|---|---|---|
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser | 166/270 |
| 5,960,880 A | 10/1999 | Nguyen et al. | 166/276 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengel et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |

| | | | | | | |
|---|---|---|---|---|---|---|
| 6,503,870 B2 | 1/2003 | Griffith et al. ............ 507/219 | 2004/0106525 A1 | 6/2004 | Willbert et al. ............ 507/200 |
| 6,508,305 B1 | 1/2003 | Brannon et al. ............ 166/293 | 2004/0138068 A1 | 7/2004 | Rimmer et al. ............ 507/100 |
| 6,527,051 B1 | 3/2003 | Reddy et al. ............ 166/300 | 2004/0149441 A1 | 8/2004 | Nguyen et al. ............ 166/280.1 |
| 6,528,157 B1 | 3/2003 | Hussain et al. ............ 428/325 | 2004/0152601 A1 | 8/2004 | Still et al. ............ 507/100 |
| 6,531,427 B1 | 3/2003 | Shuchart et al. ............ 507/267 | 2004/0177961 A1 | 9/2004 | Nguyen et al. ............ 166/280.2 |
| 6,538,576 B1 | 3/2003 | Schultz et al. ............ 340/859.6 | 2004/0194961 A1 | 10/2004 | Nguyen et al. ............ 166/295 |
| 6,543,545 B1 | 4/2003 | Chatterji et al. ............ 166/381 | 2004/0206499 A1 | 10/2004 | Nguyen et al. ............ 166/280.2 |
| 6,552,333 B1 | 4/2003 | Storm et al. ............ 250/269.3 | 2004/0211559 A1 | 10/2004 | Nguyen et al. ............ 166/276 |
| 6,554,071 B1 | 4/2003 | Reddy et al. ............ 166/293 | 2004/0211561 A1 | 10/2004 | Nguyen et al. ............ 166/280.2 |
| 6,555,507 B2 | 4/2003 | Chatterji et al. ............ 507/219 | 2004/0221992 A1 | 11/2004 | Nguyen et al. ............ 166/295 |
| 6,569,814 B1 | 5/2003 | Brady et al. ............ 507/201 | 2004/0231845 A1 | 11/2004 | Cooke, Jr. ............ 166/279 |
| 6,582,819 B2 | 6/2003 | McDaniel et al. ............ 428/402 | 2004/0231847 A1 | 11/2004 | Nguyen et al. ............ 166/295 |
| 6,593,402 B2 | 7/2003 | Chatterji et al. ............ 542/7 | 2004/0256097 A1 | 12/2004 | Byrd et al. ............ 166/90.1 |
| 6,599,863 B1 | 7/2003 | Palmer et al. ............ 507/219 | 2004/0256099 A1 | 12/2004 | Nguyen et al. ............ 166/249 |
| 6,608,162 B1 | 8/2003 | Chiu et al. ............ 528/129 | 2004/0261995 A1 | 12/2004 | Nguyen et al. ............ 166/279 |
| 6,616,320 B2 | 9/2003 | Huber et al. ............ 366/156.2 | 2004/0261997 A1 | 12/2004 | Nguyen et al. ............ 166/281 |
| 6,620,857 B2 | 9/2003 | Valet ............ 522/42 | 2005/0000731 A1 | 1/2005 | Nguyen et al. ............ 175/57 |
| 6,626,241 B2 | 9/2003 | Nguyen ............ 166/278 | 2005/0006093 A1 | 1/2005 | Nguyen et al. ............ 166/281 |
| 6,632,527 B1 | 10/2003 | McDaniel et al. ............ 428/402 | 2005/0006095 A1 | 1/2005 | Justus et al. ............ 166/295 |
| 6,632,778 B1 | 10/2003 | Ayoub et al. ............ 507/202 | 2005/0006096 A1 | 1/2005 | Nguyen et al. ............ 166/295 |
| 6,632,892 B2 | 10/2003 | Rubinsztajn et al. ............ 525/476 | 2005/0045326 A1 | 3/2005 | Nguyen ............ 166/278 |
| 6,642,309 B2 | 11/2003 | Komitsu et al. ............ 525/100 | 2005/0045330 A1 | 3/2005 | Nguyen et al. ............ 166/281 |
| 6,648,501 B2 | 11/2003 | Huber et al. ............ 366/301 | 2005/0045384 A1 | 3/2005 | Nguyen ............ 175/72 |
| 6,659,179 B2 | 12/2003 | Nguyen ............ 166/227 | 2005/0051322 A1 | 3/2005 | Nguyen et al. ............ 166/281 |
| 6,664,343 B2 | 12/2003 | Narisawa et al. ............ 525/474 | 2005/0051331 A1 | 3/2005 | Nguyen et al. ............ 166/280.2 |
| 6,667,279 B1 | 12/2003 | Hessert et al. ............ 507/225 | 2005/0059555 A1 | 3/2005 | Dusterhoft et al. ............ 507/100 |
| 6,668,926 B2 | 12/2003 | Nguyen et al. ............ 166/280 | 2005/0061509 A1 | 3/2005 | Nguyen ............ 166/307 |
| 6,669,771 B2 | 12/2003 | Tokiwa et al. ............ 106/162.7 | 2005/0092489 A1 | 5/2005 | Welton et al. ............ 166/280.2 |
| 6,681,856 B1 | 1/2004 | Chatterji et al. ............ 166/294 | 2005/0145385 A1 | 7/2005 | Nguyen ............ 166/279 |
| 6,686,328 B1 | 2/2004 | Binder ............ 510/446 | 2005/0173116 A1 | 8/2005 | Nguyen et al. ............ 166/280.2 |
| 6,705,400 B1 | 3/2004 | Nguyen et al. ............ 166/281 | 2005/0194135 A1 | 9/2005 | Nguyen ............ 166/272.1 |
| 6,710,019 B1 | 3/2004 | Sawdon et al. ............ 507/136 | 2005/0194142 A1 | 9/2005 | Nguyen ............ 166/280.2 |
| 6,713,170 B1 | 3/2004 | Kaneka et al. ............ 428/323 | 2005/0197258 A1 | 9/2005 | Nguyen ............ 507/209 |
| 6,725,926 B2 | 4/2004 | Nguyen et al. ............ 166/254.1 | 2005/0257929 A1 | 11/2005 | Nguyen et al. ............ 166/276 |
| 6,725,931 B2 | 4/2004 | Nguyen et al. ............ 166/280.2 | 2005/0263283 A1 | 12/2005 | Nguyen ............ 166/281 |
| 6,729,404 B2 * | 5/2004 | Nguyen et al. ............ 166/280.2 | 2005/0269086 A1 | 12/2005 | Nguyen et al. ............ 166/281 |
| 6,732,806 B2 | 5/2004 | Acock et al. ............ 166/308 | 2005/0274510 A1 | 12/2005 | Nguyen et al. ............ 166/250.12 |
| 6,745,159 B1 | 6/2004 | Todd et al. ............ 703/10 | 2005/0274517 A1 | 12/2005 | Blauch et al. ............ 166/280.2 |
| 6,749,025 B1 | 6/2004 | Brannon et al. ............ 166/305.1 | 2005/0277554 A1 | 12/2005 | Blauch et al. ............ 507/224 |
| 6,763,888 B1 | 7/2004 | Harris et al. ............ 166/305.1 | 2005/0284637 A1 | 12/2005 | Stegent et al. ............ 166/308.1 |
| 6,764,981 B1 | 7/2004 | Eoff et al. ............ 507/110 | | | |
| 6,766,858 B2 | 7/2004 | Nguyen et al. ............ 166/300 | FOREIGN PATENT DOCUMENTS | | |
| 6,776,236 B1 | 8/2004 | Nguyen ............ 166/279 | EP | 0313243 B1 | 10/1988 |
| 6,832,650 B2 | 12/2004 | Nguyen et al. ............ 166/279 | EP | 0528595 A1 | 8/1992 |
| 6,851,474 B2 | 2/2005 | Nguyen ............ 166/279 | EP | 0510762 A2 | 11/1992 |
| 6,887,834 B2 | 5/2005 | Nguyen et al. ............ 507/221 | EP | 0643196 A2 | 6/1994 |
| 6,978,836 B2 | 12/2005 | Nguyen et al. ............ 166/295 | EP | 0834644 A2 | 4/1998 |
| 7,063,151 B2 * | 6/2006 | Nguyen et al. ............ 166/280.2 | EP | 0853186 A2 | 7/1998 |
| 2001/0016562 A1 | 8/2001 | Muir et al. ............ 507/201 | EP | 0864726 A2 | 9/1998 |
| 2002/0043370 A1 | 4/2002 | Poe ............ 166/250.07 | EP | 0879935 B1 | 11/1998 |
| 2002/0048676 A1 | 4/2002 | McDaniel et al. ............ 428/404 | EP | 0933498 A1 | 8/1999 |
| 2002/0070020 A1 | 6/2002 | Nguyen ............ 166/295 | EP | 1001133 A1 | 5/2000 |
| 2003/0006036 A1 | 1/2003 | Malone et al. ............ 166/250.12 | EP | 1132569 A2 | 9/2001 |
| 2003/0060374 A1 | 3/2003 | Cooke, Jr. ............ 507/200 | EP | 1326003 A1 | 7/2003 |
| 2003/0114314 A1 | 6/2003 | Ballard et al. ............ 507/100 | EP | 1362978 A1 | 11/2003 |
| 2003/0130133 A1 | 7/2003 | Vollmer ............ 507/100 | EP | 1394355 A1 | 3/2004 |
| 2003/0131999 A1 | 7/2003 | Nguyen et al. ............ 166/280 | EP | 1396606 A2 | 3/2004 |
| 2003/0148893 A1 | 8/2003 | Lungofer et al. ............ 507/200 | EP | 1398460 A1 | 3/2004 |
| 2003/0186820 A1 | 10/2003 | Thesing ............ 507/200 | EP | 1403466 A2 | 3/2004 |
| 2003/0188766 A1 | 10/2003 | Banerjee et al. ............ 134/7 | EP | 1464789 A1 | 10/2004 |
| 2003/0188872 A1 | 10/2003 | Nguyen et al. ............ 166/308 | EP | 1607572 A1 | 12/2005 |
| 2003/0196805 A1 | 10/2003 | Boney et al. ............ 166/280 | GB | 1292718 | 10/1972 |
| 2003/0205376 A1 | 11/2003 | Ayoub et al. ............ 166/254.2 | GB | 2382143 A | 4/2001 |
| 2003/0230408 A1 | 12/2003 | Acock et al. ............ 166/297 | WO | WO 93/15127 | 8/1993 |
| 2003/0234103 A1 | 12/2003 | Lee et al. ............ 166/292 | WO | WO 94/07949 | 4/1994 |
| 2004/0000402 A1 | 1/2004 | Nguyen et al. ............ 166/280 | WO | WO 94/08078 | 4/1994 |
| 2004/0014607 A1 | 1/2004 | Sinclair et al. ............ 507/200 | WO | WO 94/08090 | 4/1994 |
| 2004/0014608 A1 | 1/2004 | Nguyen et al. ............ 507/200 | WO | WO 95/09879 | 4/1995 |
| 2004/0040706 A1 | 3/2004 | Hossaini et al. ............ 166/278 | WO | WO 97/11845 | 4/1997 |
| 2004/0040708 A1 | 3/2004 | Stephenson et al. ............ 166/280.1 | WO | WO 99/27229 | 6/1999 |
| 2004/0040713 A1 | 3/2004 | Nguyen et al. ............ 166/295 | WO | WO 01/81914 | 11/2001 |
| 2004/0048752 A1 | 3/2004 | Nguyen et al. ............ 507/269 | WO | WO 01/87797 A1 | 11/2001 |
| 2004/0055747 A1 | 3/2004 | Lee ............ 166/278 | | | |

| WO | WO 02/12674 A1 | 2/2002 |
| WO | WO 03/027431 A1 | 4/2003 |
| WO | WO 03/027431 A2 | 4/2003 |
| WO | WO 2004/037946 A1 | 5/2004 |
| WO | WO 2004/038176 A1 | 5/2004 |
| WO | WO 2005/021928 A2 | 3/2005 |

OTHER PUBLICATIONS

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, 2004, Halliburton Communications.

Halliburton Technical Flier—Multi Stage Frac Completion Methods, 2 pages.

Halliburton "CobraFrac$^{SM}$ Service, Coiled Tubing Fracturing—Cost-Effective Method for Stimulating Untapped Reserves", 2 pages, 2004.

Halliburton "CobraJetFrac$^{SM}$ Service, Cost-Effective Technology That Can Help Reduce Cost per BOE Produced, Shorten Cycle time and Reduce Capex".

Halliburton Cobra Frac Advertisement, 2001.

Halliburton "SurgiFrac$^{SM}$ Service, a Quick and cost-Effective Method to Help Boost Production From Openhole Horizonal Completions", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, 2004, Halliburton Communications.

Almond et al., *Factors Affecting Proppant Flowback With Resin Coated Proppants*, SPE 30096, pp. 171-186, May 1995.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al, 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy* Oil", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Albertson, pp. 1-138, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "*Poly(phenyllactide): Synthesis, Characterization, and Hydrolytic Degradation, Biomacromolecules*", vol. 2, No. 2, pp. 658-663, 2001.

Yin et al., "*Preparation and Characterization of Substituted Polyactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch. 12, pp. 147-159, 2001.

Cantu et al., "*Laboratory and Field Evaluation of a Combined Fluid-Loss Control Additive and Gel Breaker for Fracturing Fluids*," SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, "*What is Coalbed Methane?*" CDX, LLC. Available @ www.cdxgas.com/what.html, printed p. 1.

Halliburton brochure entitled "H2Zero™ Service Introducing The Next Generation of cost-Effective Conformance Control Solutions", 2002.

Halliburton brochure entitled Injectrol® A Component, 1999.

Halliburton brochure entitled "Injectrol® G Sealant", 1999.

Halliburton brochure entitled "Injectrol® IT Sealant", 1999.

Halliburton brochure entitled "Injectrol® Service Treatment", 1999.

Halliburton brochure entitled "Injectrol® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign Search Report and Written Opinion of International Application No. PCT/GB2007/000467, Feb. 9, 2007.

\* cited by examiner

METHODS OF COATING PARTICULATES

BACKGROUND

The present invention relates to improved methods of coating particulates with a resin composition so that they may be used in subterranean operations, such as hydraulic fracturing, gravel packing, and frac-packing.

Hydrocarbon-producing wells are often stimulated by hydraulic fracturing treatments. Hydraulic fracturing operations generally involve pumping a treatment fluid (e.g., a fracturing fluid or a "pad" fluid) into a well bore that penetrates a subterranean formation at a hydraulic pressure sufficient to create or enhance at least one or more fractures in the subterranean formation. The fluid used in the treatment may comprise particulates, which are often referred to as "proppant particulates," that are deposited in the resultant fractures. The proppant particulates are thought to prevent the fractures from fully closing upon the release of hydraulic pressure, forming conductive channels through which fluids may flow to a well bore to ultimately be produced. The term "propped fracture" as used herein refers to a fracture (naturally-occurring or otherwise) in a portion of a subterranean formation that contains at least a plurality of proppant particulates. The term "proppant pack" refers to a collection of proppant particulates within a fracture.

Hydrocarbon-producing wells also may undergo gravel packing treatments, inter alia, to reduce the migration of unconsolidated formation particulates into the well bore. In gravel packing operations, particulates, often referred to in the art as gravel, are suspended in a treatment fluid, which may be viscosified, and the treatment fluid is pumped into a well bore in which the gravel pack is to be placed. As the particulates are placed in or near a subterranean zone, the treatment fluid is either returned to the surface or leaks off into the zone. The resultant gravel pack acts as a filter to prevent the production of the formation solids with the produced fluids. Traditional gravel pack operations may involve placing a gravel pack screen in the well bore and then packing the surrounding annulus between the screen and the well bore with gravel. The gravel pack screen is generally a filter assembly used to support and retain the gravel placed during the gravel pack operation. A wide range of sizes and screen configurations is available to suit the characteristics of a well bore, the production fluid, and any particulates in the subterranean formation.

In some situations, hydraulic fracturing and gravel packing operations may be combined into a single treatment. Such treatments are often referred to as "frac pack" operations. In some cases, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Particulates (such as proppant or gravel) used in subterranean operations are often coated with resins to facilitate consolidation of the particulates and/or to prevent their subsequent flow-back through the conductive channels in the subterranean formation, which can, for example, clog the conductive channels and/or damage the interior of the formation or equipment. The term "resin" as used herein refers to any of numerous physically similar polymerized synthetics or chemically modified natural resins including thermoplastic materials and thermosetting materials.

A typical resin coating material is a two component resin system comprising a liquid hardenable resin component and a liquid hardening agent component. Heretofore, resin coated particulates have been coated by mixing both of the components of the resin system together on-the-fly to form a hardenable resin composition and then coating particulates with this hardenable resin composition at the well site. The term "on-the-fly" is used herein to mean that a flowing stream is continuously introduced into another flowing stream so that the streams are combined and mixed while continuing to flow as a single stream. Although this technique is frequently used to coat particulates, this method can be problematic. Once the two components of a resin coating material are mixed together to form a hardenable resin composition, the hardenable resin component becomes activated by the hardening agent component thus becoming tackified. As used herein, the term "tacky," in all of its forms, generally refers to a substance having a nature such that it is (or may be activated to become) somewhat sticky to the touch. The hardenable resin composition may stick to equipment with which it may come into contact with during the particulate coating process or while being mixed into a treatment fluid thereby decreasing the efficiency of the coating process and making the equipment difficult to clean.

Another problem encountered in the use of hardenable resin compositions for coating particulates is that the hardenable resin composition has a very short shelf life. That is, once batch mixed, the shelf life of the hardenable resin composition may be as short as four hours or less. Heretofore, it has been a common practice to utilize particulates that have been precoated with a resin system where only a small portion of the resin remains curable, so that the resin pre-coated particulates can then be stored for later use. When the precoated particulates are required for use at a job site, they are then transported to the job site. However, when such precoated resin coated particulates are consolidated after being placed in a subterranean formation, the resulting consolidated particulates often do not have enough strength to prevent proppant flow-back and do not perform effectively.

SUMMARY

The present invention relates to improved methods of coating particulates with a resin composition so that they may be used in subterranean operations such as hydraulic fracturing, gravel packing, and frac-packing.

In one embodiment, the present invention provides a method comprising providing at least a plurality of particulates that have been at least partially coated with a liquid hardenable resin component so as to produce at least a plurality of liquid hardenable resin coated particulates; providing at least a plurality of particulates that have been at least partially coated with a liquid hardening agent component so as to produce at least a plurality of liquid hardening agent coated particulates; suspending the liquid hardenable resin coated particulates and the liquid hardening agent coated particulates in a treatment fluid; and placing the treatment fluid into a subterranean formation.

In another embodiment, the present invention provides a method comprising providing a treatment fluid comprising at least a plurality of particulates that have been at least partially coated with a liquid hardenable resin component so as to produce at least a plurality of liquid hardenable resin coated particulates and at least a plurality of particulates that have been at least partially coated with a liquid hardening agent component so as to produce at least a plurality of liquid hardening agent coated particulates; and placing the treatment fluid into a subterranean formation.

In another embodiment, the present invention provides a method comprising providing at least a plurality of coated particulates that have been at least partially coated with one component of a two component resin system; coating at least a plurality of the coated particulates on a job site with a second component of a two component resin system; suspending the coated particulates in a treatment fluid; and placing the treatment fluid into a subterranean formation.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to improved methods of coating particulates with a resin composition so that they may be used in subterranean operations, such as hydraulic fracturing, gravel packing, and frac-packing. One of the many advantages of the present invention is that the methods may enhance the coating efficiency and consolidation performance of coated particulates. Also, the methods of the present invention may allow for relatively easy clean up of equipment used to coat particulates with resin compositions. Additionally, the methods of the present invention may also reduce potential damage to coating equipment due to resin buildup and increase their coating efficiency.

In accordance with the methods of the present invention, at least a plurality of particulates are at least partially coated with one component of a two component resin system, for example, a liquid hardenable resin component. This portion of coated particulates, may be referred to as "liquid hardenable resin coated particulates." The term "coated" does not imply any particular degree of coverage of the particulates with a resin. The particulates may be coated by any suitable method as recognized by one skilled in the art with the benefit of this disclosure. Another portion of a similar volume of particulates are at least partially coated with a second component of a two component resin system, such as the liquid hardening agent component. This second portion, which is not coated with the first component, may be referred to as "liquid hardening agent coated particulates." Both portions of the coated particulates may then be suspended in a treatment fluid (possibly with additional uncoated particulates), and this treatment fluid may be placed into a subterranean formation. The particulates may be suspended in the treatment fluid by any suitable method as recognized by one skilled in the art with the benefit of this disclosure, including using a fracturing blender. As a result of the methods of the present invention, the two components of the resin system should not interact with each other before the liquid hardenable resin coated particulates and the liquid hardening agent coated particulates are suspended in the treatment fluid, and thus, should not become activated until they are introduced into the treatment fluid and in contact with each other.

In some embodiments, to minimize costs associated with the use of a resin composition, uncoated proppant may be added to the treatment fluid in amount from about 5% to about 75% of the total volume of particulates used, if desired.

The components of the resin system, i.e., the liquid hardenable resin component and the liquid hardening agent component, may be precoated onto particulates and then stored separately or together. Optionally, these precoated particulates may be at least partially coated with a partitioning agent to at least temporarily inhibit or minimize the interaction between the liquid hardenable resin coated particulates and the liquid hardening agent coated particulates. Suitable partitioning agents dissolve, degrade, or are otherwise removed from the surface of the particulate at a desired time such that the curing performance of the resin system is substantially restored once the partitioning agent is substantially removed.

When combined in a treatment fluid, the liquid hardening agent coated particulates and the liquid hardenable resin coated particulates may be combined in a desired volume ratio of about 1 part liquid hardening agent coated particulates to about 1 part liquid hardenable resin coated particulates. A weight ratio may be applied, instead of a volume ratio, provided that only one type of particulate is used in the treatment. One skilled in the art with the benefit of this disclosure will recognize that this ratio can vary to suit the application at issue, e.g., 2 parts liquid hardenable resin coated particulates to about 1 part liquid hardening agent coated particulates to obtain the desired consolidation strength, curing time, etc.

In one alternative embodiment of the present invention, a portion of a given volume of particulates may be coated with one component of the two component resin system. This portion of particulates may then be stored until brought to the well site, where the particulates may then be coated with the second component of the two component resin system, and mixed into a treatment fluid for introduction into a subterranean formation. This alternative method may be desirable as a safety precaution or when only one of the two components can easily be precoated.

A wide variety of particulate materials may be used in accordance with the present invention, including, but not limited to, sand, bauxite, ceramic materials, glass materials, resin precoated proppant (e.g., commercially available from Borden Chemicals and Santrol, for example, both from Houston, Tex.), polymer materials, "TEFLON™" (tetrafluoroethylene) materials, nut shells, ground or crushed nut shells, seed shells, ground or crushed seed shells, fruit pit pieces, ground or crushed fruit pits, processed wood, composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, and solid glass; or mixtures thereof. The particulate material used may have a particle size in the range of from about 2 to about 400 mesh, U.S. Sieve Series. Preferably, the particulate material is graded sand having a particle size in the range of from about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the particulate materials.

In some embodiments, different sizes and types of particulates may be utilized such that one type or size of particulate may be coated with one of the components of the resin system and another type or size of particulate may be coated with the second component of the resin system. By way of example, a low-density particulate may be coated with one of the components of a two component resin system and a high-density particulate may be coated with the second component of a two component resin system. Also for example, a large mesh-size particulate may be coated with one of the components of a two component resin system and a smaller mesh-size particulate may be coated with the second component of a two component resin system. As will be understood by one skilled in the art, more than two types or sizes of particulates may be used. This may be particularly useful in situations where it is desirable to obtain high proppant pack permeability (i.e., conductivity), high consolidation strength, or lower pack density.

As mentioned above, the particulates are coated with a two component resin system. Resins suitable for use in the present invention include all resins known and used in the art. One type of resin coating material suitable for use in the methods of the present invention is a two component epoxy based resin comprising a liquid hardenable resin component and a liquid hardening agent component. The liquid hardenable resin component is comprised of a hardenable resin and an optional solvent. The solvent may be added to the resin to reduce its viscosity for ease of handling, mixing, and transferring. It is within the ability of one skilled in the art with the benefit of this disclosure to determine if and how much solvent may be needed to achieve a viscosity suitable to the subterranean conditions. Factors that may affect this decision include geographic location of the well, the surrounding weather conditions, and the desired long-term stability of the hardenable resin composition. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, among other things, breaking gelled fracturing fluid films on the proppant particulates, and an optional liquid carrier fluid for, among other things, reducing the viscosity of the liquid hardening agent component.

Examples of hardenable resins that can be used in the liquid hardenable resin component include, but are not limited to, organic resins such as bisphenol A diglycidyl ether resin, butoxymethyl butyl glycidyl ether resin, bisphenol A-epichlorohydrin resin, bisphenol F resin, polyepoxide resin, novolak resin, polyester resin, phenol-aldehyde resin, urea-aldehyde resin, furan resin, urethane resin, a glycidyl ether resin, other similar epoxide resins and combinations thereof. The hardenable resin used may be included in the liquid hardenable resin component in an amount in the range of from about 5% to about 95% by weight of the liquid hardenable resin component. In other embodiments, the hardenable resin used may be included in the liquid hardenable resin component in an amount in the range of from about 15% to about 85% by weight of the liquid hardenable resin component. In other embodiments the hardenable resin used may be included in the liquid hardenable resin component in an amount of about 25% to about 55% by weight of the liquid hardenable resin component. It is within the ability of one skilled in the art with the benefit of this disclosure to determine how much of the hardenable resin component may be needed to achieve the desired results. Factors that may affect this decision include which type of hardenable resin component and hardening agent component are used. The concentration of the liquid hardenable resin component that may be coated on the particulates is in the range of from about 0.1% to about 5% (volume by weight of proppant), with about 0.5% to about 2% being preferred.

Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, ethanol, butyl alcohol, d'limonene, fatty acid methyl esters, and combinations thereof. Other preferred solvents may include aqueous dissolvable solvents such as, methanol, ethanol, isopropanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure.

As described above, use of a solvent in the liquid hardenable resin component is optional but may be desirable to reduce the viscosity of the liquid hardenable resin component for ease of handling, mixing, and transferring. It is within the ability of one skilled in the art, with the benefit of this disclosure, to determine if and how much solvent is needed to achieve a suitable viscosity. In some embodiments, the amount of the solvent used in the liquid hardenable resin component may be in the range of from about 0.1% to about 80% by weight of the liquid hardenable resin component. Optionally, the liquid hardenable resin component may be heated to reduce its viscosity, in place of, or in addition to, using a solvent.

Examples of the hardening agents that can be used in the liquid hardening agent component of the resin compositions utilized in the present invention include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine, such as aminoethyl piperazine, have been shown capable of curing various hardenable resins from temperatures as low as about 70° F. to as high as about 350° F. The hardening agent used may be included in the liquid hardening agent component in an amount sufficient to consolidate the coated particulates. In some embodiments of the present invention, the hardening agent used is included in the liquid hardening agent component in the range of from about 5% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 25% to about 55% by weight of the liquid hardening agent component. The concentration of the liquid hardening agent component that may be coated on the particulates is in the range of from about 0.1% to about 5% (volume by weight of proppant), with about 0.5% to about 2% being preferred.

The silane coupling agent may be used, among other things, to act as a mediator to help bond the resin to formation particulates and/or proppant. Examples of suitable silane coupling agents include, but are not limited to, N-β-(aminoethyl)-γ-aminopropyl trimethoxysilane, N-2-(aminoethyl)-3-aminopropyltrimethoxysilane, 3-glycidoxypropyltrimethoxysilane, and combinations thereof. The silane coupling agent used is included in the liquid hardening agent component in an amount capable of sufficiently bonding the resin to the particulate. In some embodiments of the present invention, the silane coupling agent used may be included in the liquid hardening agent component in the range of from about 0.1% to about 3% by weight of the liquid hardening agent component.

Any surfactant compatible with the hardening agent and capable of facilitating the coating of the resin onto particulates in the subterranean formation may be used in the liquid hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued on Nov. 6, 2001 to Todd, et al., the relevant disclosure of which is incorporated herein by reference. In some embodiments, the surfactant used may be included in the liquid hardening agent component in the range of from about 1% to about 10% by weight of the liquid hardening agent component.

While not required, examples of hydrolyzable esters that may be used in the liquid hardening agent component include, but are not limited to, a mixture of dimethylglutarate, dimethyladipate, and dimethylsuccinate; dimethylthiolate; methyl salicylate; dimethyl salicylate; dimethylsuccinate; t-butylhydroperoxide; and combinations thereof. When used, a hydrolyzable ester may be included in the liquid hardening agent component in an amount in the range of from about 0.1% to about 3% by weight of the liquid hardening agent component. In some embodiments, a hydrolyzable ester may be included in the liquid hardening agent component in an amount in the range of from about 1% to about 2.5% by weight of the liquid hardening agent component.

Another resin suitable for use in the methods of the present invention are furan-based resins. Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use in the furan-based resins include, but are not limited to 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred.

Still another resin suitable for use in the methods of the present invention is a phenolic-based resin. Suitable phenolic-based resins include, but are not limited to, terpolymers of phenol, phenolic formaldehyde resins, and a mixture of phenolic and furan resins. Of these, a mixture of phenolic and furan resins is preferred. A phenolic-based resin may be combined with a solvent to control viscosity if desired. Suitable solvents for use in the phenolic-based resins include, but are not limited to butyl acetate, butyl lactate, furfuryl acetate, and 2-butoxy ethanol. Of these, 2-butoxy ethanol is preferred.

Yet another resin-type coating material suitable for use in the methods of the present invention is a phenol/phenol formaldehyde/furfuryl alcohol resin comprising from about 5% to about 30% phenol, from about 40% to about 70% phenol formaldehyde, from about 10% to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Suitable surfactants include, but are not limited to, an ethoxylated nonyl phenol phosphate ester, mixtures of one or more cationic surfactants, and one or more non-ionic surfactants and an alkyl phosphonate surfactant.

Generally, any treatment fluid suitable for a subterranean operation may be used in accordance with the methods of the present invention, including aqueous gels, viscoelastic surfactant gels, foamed gels and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In certain embodiments of the present invention, the treatment fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, inter alia, reduces fluid loss and allows the treatment fluid to transport significant quantities of suspended particulates. The water used to form the treatment fluid may be fresh water, salt water, brine, sea water, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling agents typically comprise polymers, synthetic polymers, or a combination thereof. A variety of gelling agents may be used in conjunction with the methods of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In some embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents that may be used in conjunction with the methods of the present invention may be present in the treatment fluid in an amount in the range of from about 0.01% to about 5% by weight of the water therein. In some embodiments, the gelling agents may be present in the treatment fluid in an amount in the range of from about 0.01% to about 2% by weight of the water therein.

Crosslinking agents may be used to crosslink gelling agent molecules to form crosslinked gelling agents. Crosslinkers typically comprise at least one metal ion that is capable of crosslinking molecules. Examples of suitable crosslinkers include, but are not limited to, zirconium compounds (such as, for example, zirconium lactate, zirconium lactate triethanolamine, zirconium acetylacetonate, zirconium citrate, and zirconium diisopropylamine lactate); titanium compounds (such as, for example, titanium lactate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan, Okla. Suitable crosslinkers that may be used in conjunction with the methods of the present invention may be present in the treatment fluid in an amount sufficient to provide, inter alia, the desired degree of crosslinking between gelling agent molecules. In some embodiments of the present invention, the crosslinkers may be present in the treatment fluid in an amount in the range from about 0.001% to about 10% by weight of the water therein. In other embodiments of the present invention, the crosslinkers may be present in the treatment fluid in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place particulates in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

As described above, the use of a partitioning agent is optional but may be desirable to at least temporarily inhibit or minimize the interaction between the liquid hardenable resin coated particulates and the liquid hardening agent coated particulates. Partitioning agents that may be suitable for use in the present invention are those substances that will dissipate once the particulates are introduced to a treatment fluid, such as a fracturing or gravel packing fluid. Partitioning agents suitable for use in the present invention should not detrimentally interfere with liquid hardenable resin coated particulates or liquid hardening agent coated particulates, and should not detrimentally interfere with the treatment fluid or the subterranean operation being performed. This does not mean that the chosen partitioning agent must be inert. Rather, in some embodiments the partitioning agent may also be a treatment chemical that has a beneficial effect on the subterranean environment, or the operation, or both. When used, the partitioning agent may be coated onto the liquid hardenable resin coated particulates and/or the liquid hardening agent coated particulates in an amount of from about 1% to about 20% by weight of the coated particulate.

Examples of suitable partitioning agents that will dissolve quickly in an aqueous treatment fluid include solid salts (such as rock salt, fine salt, KCl, table salt, NaCl, and other solid salts known in the art), barium sulfate, lime, benzoic acid, polyvinyl alcohol, sodium carbonate, sodium bicarbonate, molybdenum disulfide, sodium hydroxide, graphite, zinc, lime, quebracho, lignin, lignite, causticized lignite, lignosulfonate, chrome lignosulfonate, napthalenesulfonate, uintahite (gilsonite), polyvinyl alcohol, and mixtures thereof. One skilled in the art will recognize that where lime (calcium carbonate) is chosen for use as a partitioning agent in the present invention it may be used in any of its forms, including quicklime, hydrated lime, and hydraulic lime.

The partitioning agent also may be a substance that dissipates more slowly in the presence of the treatment fluid. Partitioning agents that dissolve more slowly may allow the operator more time to place the coated particulates. Examples of suitable partitioning agents that may dissolve more slowly in an aqueous treatment fluid include calcium oxide, degradable polymers, such as polysaccharides; chitins; chitosans; proteins; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); and poly(phosphazenes); and mixtures thereof.

Where the treatment fluid is an oleaginous treatment fluid, examples of suitable partitioning agents that may dissolve in an oleaginous treatment fluid include wax, gilsonite, sulfonated asphalt, naphthalenesulfonate, oil soluble resins, and combinations thereof. Some suitable oil soluble resins include, but are not limited to, styrene-isoprene copolymers, hydrogenated styrene-isoprene block copolymers, styrene ethylene/propylene block copolymers, styrene isobutylene copolymers, styrene-butadiene copolymers, polybutylene, polystyrene, polyethylene-propylene copolymers, and combinations thereof.

The chosen partitioning agent should be able to at least temporarily inhibit or minimize the interaction between the liquid hardenable resin coated particulates and the liquid hardening agent coated particulates, but it may also perform other functions. For example, the partitioning agent may act as a scale inhibitor, corrosion inhibitor, parrafin remover, gel breaker, crosslink de-linker, gas hydrate inhibitor, or any other solid treatment chemical that can be coated on top of liquid hardenable resin coated particulates and/or liquid hardening agent coated particulates to at least temporarily inhibit or minimize the interaction between these particulates.

Moreover, in some embodiments a resin component and partitioning agent may be coated onto a particulate in layers. By way of example, a particulate may be coated with one component of a two component resin system and then coated with a partitioning agent and then coated again with one component of a two component resin system and then coated again with a partitioning agent. In such a case, the first and second coatings of the component of the resin system need not be the same and the first and second coatings of the partitioning agent need not be the same. As will be understood by one skilled in the art, more than two layers of the resin component and partitioning agents may be used. This may be particularly useful in situations wherein it is desirable to delay the release of a partitioning agent that also acts as a treatment chemical. For example, a first (inner) layer of partitioning agent may be a treatment chemical that is a gel breaker and a second layer of partitioning agent may be an inert, slowly dissolving partitioning agent. Also for example, the first (inner) layer of partitioning agent may be a crosslinker, with a second layer of partitioning agent being a slowly dissolving partitioning agent.

To facilitate a better understanding of the present invention, the following examples of certain aspects of some embodiments are given. In no way should the following examples be read to limit, or define, the entire scope of the invention.

EXAMPLE 1

Consolidation strength testing was performed using commercially available two component resin systems available under the trade names "EXPEDITE 225" and "EXPEDITE 350," available from Halliburton Energy Services. Sample portions of equal volumes of 20/40 Brady sand were each coated with one component of a two component resin system. Sample 1 contained two equal portions of sand, one portion was coated with 1.5% of the liquid hardenable resin component of EXPEDITE 225 by weight of proppant and the other portion was coated with 1.5% of the liquid hardening agent component of EXPEDITE 225 by weight of proppant. Sample 2 contained two portions of sand, one portion was coated with 1.5% of the liquid hardenable resin component of EXPEDITE 350 by weight of proppant and the other portion was coated with 1.5% of the liquid hardening agent component of EXPEDITE 350 by weight of proppant.

Sample 1 was set aside for one week after the portions of sand were coated. The two coated portions of sand were then mixed together in a linear gel to form a slurry and stirred for approximately 15 minutes at room temperature using an overhead stirrer. The slurry was then packed in a brass cell and cured for 16 hours at 150° F. After curing, the consolidated pack was removed and the unconfined compressive strength (UCS) was measured. The results are given below in Table 1.

Sample 2 was set aside for four weeks after the portions of the sand were coated. The two coated portions of sand were then mixed together in a linear gel to form a slurry and then placed in a heat bath at 150° F. and stirred for approximately 30 minutes. The slurry was then packed in a brass cell and cured for 16 hours at 300° F. After curing, the consolidated pack was removed and the unconfined compressive strength (UCS) was measured.

Table 1 summarizes the results:

TABLE 1

| Sample | Cure Time (hours) | UCS (psi) |
| --- | --- | --- |
| 1 | 16 | 75 |
| 2 | 16 | 1597 |

From Table 1, it is evident that the resin-treated proppants achieve unconfined compressive strengths.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   providing at least a plurality of liquid hardenable resin coated particulates that have been at least partially coated with a liquid hardenable resin component but not coated with a liquid hardening agent component;
   providing at least a plurality of liquid hardening agent coated particulates that have been at least partially coated with a liquid hardening agent component but not coated with a liquid hardenable resin component;
   wherein the liquid hardenable resin coated particulates and the liquid hardening agent coated particulates are at least partially coated with a partitioning agent;
   suspending the liquid hardenable resin coated particulates and the liquid hardening agent coated particulates in a treatment fluid; and
   placing the treatment fluid into a subterranean formation.

2. The method of claim 1 wherein the liquid hardenable resin component is coated on the liquid hardenable resin coated particulates in an amount in the range of from about 0.1% to about 5% by weight of proppant.

3. The method of claim 1 wherein the liquid hardenable resin component comprises a hardenable resin selected from the group consisting of a bisphenol A-epichlorohydrin resin, polyepoxide resin, novolak resin, polyester resin, phenolaldehyde resin, urea-aldehyde resin, furan resin, urethane resin, glycidyl ether, and a combination thereof.

4. The method of claim 1 wherein the liquid hardening agent component is coated on the liquid hardening agent coated particulates in an amount in the range of from about 0.1% to about 5% by weight of proppant.

5. The method of claim 1 wherein the liquid hardening agent component comprises a hardening agent, a silane coupling agent, and a surfactant.

6. The method of claim 5 wherein the hardening agent is selected from the group consisting of an amine, aromatic amine, aliphatic amine, cyclo-aliphatic amine, piperidine, triethylamine, benzyldimethylamine, N,N-dimethylaminopyridine, 2-($N_2$N-dimethylaminomethyl)phenol, tris(dimethylaminomethyl)phenol, and a combination thereof.

7. The method of claim 1 wherein the treatment fluid further comprises uncoated particulates in the range of from about 5 to about 75%.

8. The method of claim 1 wherein the partitioning agent is selected from the group consisting of a solid salt, barium sulfate, lime, benzoic acid, polyvinyl alcohol, sodium carbonate, sodium bicarbonate, molybdenum disulfide, sodium hydroxide graphite, zinc, quebracho, lignin, lignite, causticized lignite, lignosulfonate, chrome lignosulfonate, napthalenesulfonate, uintahite (gilsonite), and a combination thereof.

9. A method comprising:
- providing a treatment fluid comprising:
  - at least a plurality of liquid hardenable resin coated particulates that have been at least partially coated with a liquid hardenable resin component but not coated with a liquid hardening agent component; and
  - at least a plurality of liquid hardening agent coated particulates that have been at least partially coated with a liquid hardening agent component but not coated with a liquid hardenable resin component;
  - wherein the liquid hardenable resin coated particulates and the liquid hardening agent coated particulates are at least partially coated with a partitioning agent; and
- placing the treatment fluid into a subterranean formation.

10. The method of claim 9 wherein the liquid hardenable resin component is coated on the liquid hardenable resin coated particulates in an amount in the range of from about 0.1% to about 5% by weight of proppant.

11. The method of claim 9 wherein the liquid hardenable resin component comprises a hardenable resin selected from the group consisting of a bisphenol A-epichlorohydrin resin, polyepoxide resin, novolak resin, polyester resin, phenol-aldehyde resin, urea-aldehyde resin, furan resin, urethane resin, glycidyl ether, and a combination thereof.

12. The method of claim 9 wherein the liquid hardening agent component is coated on the liquid hardening agent coated particulates in an amount in the range of from about 0.1% to about 5% by weight of proppant.

13. The method of claim 9 wherein the liquid hardening agent component comprises a hardening agent, a silane coupling agent, and a surfactant.

14. The method of claim 13 wherein the hardening agent is selected from the group consisting of an amine, aromatic amine, aliphatic amine, cyclo-aliphatic amine, piperidine, triethylamine, benzyldimethylamine, N,N-dimethylaminopyridine, 2-(N2N-dimethylaminomethyl)phenol, tris(dimethylaminomethyl)phenol, and a combination thereof.

15. The method of claim 13 wherein the silane coupling agent is selected from the group consisting of a N-2-(aminoethyl)-3-aminopropyltrimethoxysilane, 3-glycidoxypropyltrimethoxysilane, n-beta-(aminoethyl)-gamma-aminopropyl trimethoxysilane and a combination thereof.

16. The method of claim 9 wherein the treatment fluid further comprises uncoated particulates in the range of from about 5 to about 75%.

17. The method of claim 9 wherein the partitioning agent is selected from the group consisting of a solid salt, barium sulfate, lime, benzoic acid, polyvinyl alcohol, sodium carbonate, sodium bicarbonate, molybdenum disulfide, sodium hydroxide graphite, zinc, quebracho, lignin, lignite, causticized lignite, lignosulfonate, chrome lignosulfonate, napthalenesulfonate, uintahite (gilsonite), and a combination thereof.

* * * * *